(12) United States Patent
Yamagishi et al.

(10) Patent No.: US 8,849,236 B2
(45) Date of Patent: Sep. 30, 2014

(54) EMERGENCY-INFORMATION RECEIVING METHOD, MOBILE STATION, AND RADIO BASE STATION

(75) Inventors: Hiroaki Yamagishi, Yokohama (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 269 days.

(21) Appl. No.: 12/922,742

(22) PCT Filed: Apr. 24, 2009

(86) PCT No.: PCT/JP2009/058201
§ 371 (c)(1), (2), (4) Date: Dec. 20, 2010

(87) PCT Pub. No.: WO2009/131224
PCT Pub. Date: Oct. 29, 2009

(65) Prior Publication Data
US 2011/0086608 A1    Apr. 14, 2011

(30) Foreign Application Priority Data

Apr. 25, 2008  (JP) .................................. 2008-116464
Apr. 25, 2008  (JP) .................................. 2008-116465

(51) Int. Cl.
*H04M 11/04* (2006.01)
*H04W 48/12* (2009.01)
*G08B 27/00* (2006.01)
*H04W 72/12* (2009.01)
*H04W 4/06* (2009.01)
*H04W 68/00* (2009.01)
*H04W 4/22* (2009.01)
*H04W 76/00* (2009.01)

(52) U.S. Cl.
CPC .............. *H04W 48/12* (2013.01); *H04M 11/04* (2013.01); *H04W 72/1289* (2013.01); *H04W 4/06* (2013.01); *G08B 27/006* (2013.01); *H04W 68/00* (2013.01); *H04W 72/1242* (2013.01); *H04W 4/22* (2013.01); *H04W 76/007* (2013.01)
USPC ........................................................ 455/404.1

(58) Field of Classification Search
CPC ........ H04W 4/22; H04W 11/04; H04W 24/00
USPC .............. 455/404.1, 567, 411, 458, 453, 450, 455/456.3, 566, 414.1; 370/465; 340/932.2, 340/311.2, 438
See application file for complete search history.

(56) References Cited

U.S. PATENT DOCUMENTS 8,254,873 B2 *  8/2012  Kitahara et al. ............ 455/404.1
2005/0037728 A1 *  2/2005  Binzel et al. ................ 455/404.1
(Continued)

FOREIGN PATENT DOCUMENTS

EP    2 037 596 A1    3/2009
WO   2007/045564 A1  4/2007
(Continued)

OTHER PUBLICATIONS

Extended European Search Report for Application No. 09734916.1 dated Apr. 8, 2011 (9 pages).
(Continued)

*Primary Examiner* — Kiet Doan
(74) *Attorney, Agent, or Firm* — Osha Liang LLP

(57) ABSTRACT

An emergency-information receiving method according to the present invention includes: starting, at mobile stations (UE), receiving scheduling-information-notification system information at a current modification period without waiting until a next modification period starts, when detecting a predetermined trigger; and receiving, at the mobile stations (UE), emergency-information-notification system information on the basis of scheduling information notified by the received scheduling-information-notification system information.

12 Claims, 9 Drawing Sheets

(56) References Cited

U.S. PATENT DOCUMENTS

2007/0202927 A1* 8/2007 Pfleging et al. ............... 455/567
2009/0239554 A1* 9/2009 Sammour et al. ............. 455/458
2010/0035574 A1   2/2010 Punz

FOREIGN PATENT DOCUMENTS

WO    2007/148703 A1   12/2007
WO    2009/004824 A1   1/2009

OTHER PUBLICATIONS

3GPP TSG RAN WG2 #61bis, Panasonic, "ETWS Support in Rel-8", R2-082231, Shenzhen, China, Mar. 31-Apr. 4 (1 page).
3GPP TSG-RAN WG2 #62-bis, Ericsson, "Details of the ETWS Solution", Tdoc R2-083168, Warsaw, Poland, Jun. 30 to Jul. 4, 2008 (3 pages).
3GPP TS 36.331 V8.1.0, "Evolved Universal Terrestrial Radio Access (E-UTRA); Radio Resource Control (RRC)," Mar. 2008, 122 pages.
3GPP TS 25.331 V7.8.0, "Technical Specification Group Radio Access Network; Radio Resource Control (RRC)," Mar. 2008, 1472 pages.
NTT DoCoMo, "Way forward for ETWS," 3GPP TSG-RAN-WG2 Meeting #60bis, R2-080396, Jan. 14-18, 2008, 4 pages.
Decision to Grant a Patent mailed on May 26, 2009, issued for Japanese Patent Application No. 2008-116465, with translation and verification thereof, 6 pages (corresponds to WO 2009/004824 A1).
International Search Report issued in PCT/JP2009/058201, mailed on May 26, 2009, with translation, 3 pages.
Written Opinion issued in PCT/JP2009/058201, mailed on May 26, 2009, 3 pages.
Offiice Action issued in Vietnamese Patent Application No. 1-2010-02921, mailing date Jan. 24, 2014, with English translation thereof (4 pages).
3GPP TSG-RAN-WG2 Meeting #60bis, R2-080396, "Way Forward for ETWS," NTT DoCoMo, Sevilla, Spain, Jan. 14-18, 2008 (4 pages).
Office Action for Chinese Application No. 200980113248.6 Issued Mar. 7, 2012, with English translation thereof (15 pages).

* cited by examiner

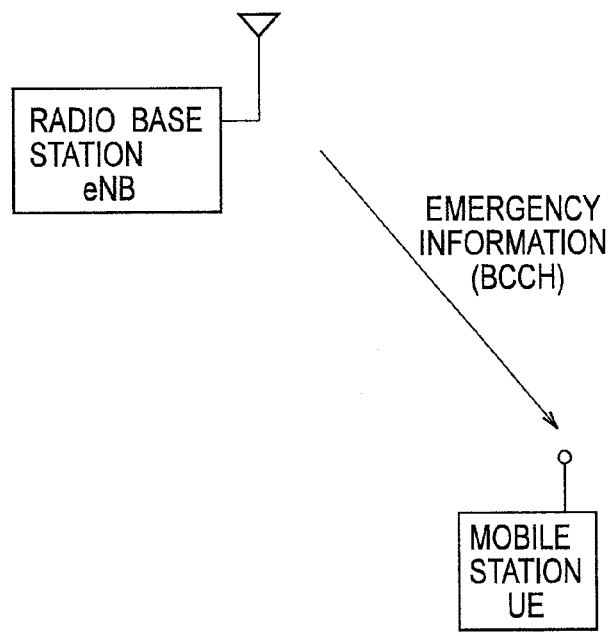
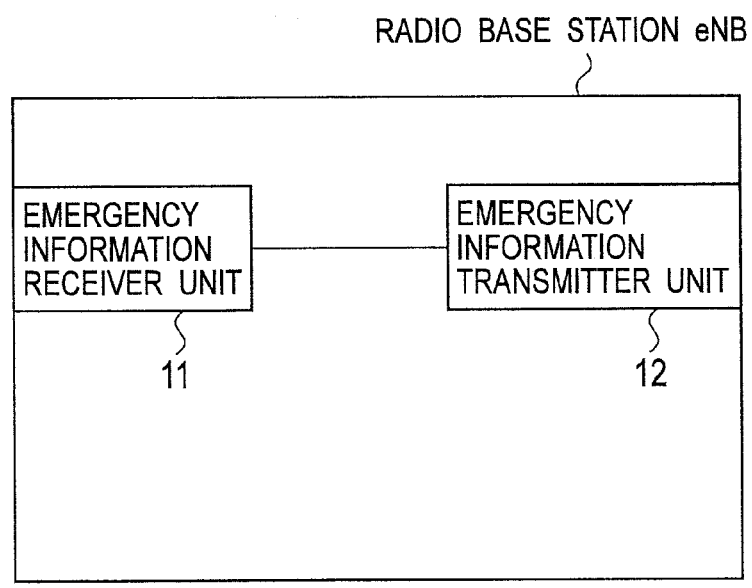

EMERGENCY-INFORMATION RECEIVING METHOD, MOBILE STATION, AND RADIO BASE STATION

TECHNICAL FIELD

The present invention relates to an emergency-information receiving method in which a plurality of mobile stations receives emergency information in a mobile communication system in which a radio base station is configured to transmit a plurality of types of system information repeatedly within a modification period to the mobile stations via a broadcast channel, and to notify the mobile stations of a predetermined trigger via the broadcast channel regardless of the modification period. The present invention also relates to the mobile station and the radio base station.

BACKGROUND ART

Heretofore, the "ETWS (Earthquake and Tsunami Warning System)", the "PWS (Public Warning System)", and the like have been known as systems to transmit emergency information to multiple mobile stations.

Use of a SIB (System Information Block) on a broadcast channel (BCCH: Broadcast Control Channel) to transmit emergency information to multiple mobile stations has been considered for such "ETWS/PWS".

In a conventional "ETWS/PWS", however, a radio base station is configured to transmit multiple types of system information (SIB1 to SIB8) repeatedly within a modification period (MP). This causes a problem that, even if detecting occurrence of emergency information, the radio base station cannot make notification of the emergency information in the current modification period MP(n), and cannot transmit the emergency information until the next modification period MP(n+1) starts.

SUMMARY OF THE INVENTION

The present invention has been made in view of the above problem, and has an object to provide an emergency-information receiving method, a mobile station, and a radio base station which allow multiple mobile stations to receive emergency information as quickly as possible upon detection of occurrence of the emergency information.

A first aspect of the present invention is summarized as an emergency-information receiving method in which a plurality of mobile stations receives emergency information in a mobile communication system in which a radio base station is configured to transmit a plurality of types of system information repeatedly within a modification period to the mobile stations via a broadcast channel, and to notify the mobile stations of a predetermined trigger via the broadcast channel regardless of the modification period, the method including the steps of: (A) starting, at the mobile stations, receiving scheduling-information-notification system information at a current modification period without waiting until a next modification period starts, when detecting the predetermined trigger; and (B) receiving, at the mobile stations, emergency-information-notification system information on the basis of scheduling information notified by the received scheduling-information-notification system information.

In the first aspect, the emergency-information receiving method can further include a step of: (C) performing, at the mobile stations, processing corresponding to the emergency information notified by the received emergency-information-notification system information.

A second aspect of the present invention is summarized as a mobile station configured to receive emergency information in a mobile communication system in which a radio base station is configured to transmit a plurality of types of system information repeatedly within a modification period to a plurality of mobile stations via a broadcast channel, and to notify the mobile stations of a predetermined trigger via the broadcast channel regardless of the modification period, the mobile station including: a scheduling-information-notification system information receiver unit configured to start receiving scheduling-information-notification system information at a current modification period without waiting until a next modification period starts, when detecting the predetermined trigger; and an emergency-information-notification system information receiver unit configured to receive emergency-information-notification system information on the basis of scheduling information notified by the received scheduling-information-notification system information.

In the second aspect, the mobile station can further include: a processor unit configured to perform processing corresponding to the emergency information notified by the received emergency-information-notification system information.

In the second aspect, the emergency-information-notification system information receiver unit can be configured to receive no scheduling information except the emergency-information-notification system information.

In the second aspect, the scheduling-information-notification system information receiver unit can be configured to start receiving the scheduling-information-notification system information at the current modification period without waiting until the next modification period starts, when the mobile station is in an idle state or a communicating state, and when the scheduling-information-notification system information receiver unit detects a predetermined indicator included in a paging message as the predetermined trigger.

In the second aspect, the scheduling-information-notification system information receiver unit can be configured to start receiving the scheduling-information-notification system information at the current modification period without waiting until the next modification period starts, when the mobile station is in an idle state or a communicating state, and when the scheduling-information-notification system information receiver unit detects a predetermined indicator as the predetermined trigger via a physical downlink control channel including a paging identifier.

In the second aspect, the scheduling-information-notification system information receiver can be configured to start receiving the scheduling-information-notification system information at the current modification period without waiting until the next modification period starts, when receiving a predetermined indicator as the predetermined trigger via a physical downlink control channel including a predetermined identifier.

A third aspect of the present invention is summarized as a radio base station configured to transmit emergency information in a mobile communication system in which the radio base station is configured to transmit a plurality of types of system information repeatedly within a modification period to a plurality of mobile stations via a broadcast channel, and to notify the mobile stations of a predetermined trigger via the broadcast channel regardless of the modification period, the radio base station including: a scheduling-information-notification system information transmitter unit configured to notify, to the plurality of mobile stations, a predetermined trigger, and to transmit, to the plurality of mobile stations, scheduling-information-notification system information for notifying scheduling information which specifies a downlink resource for starting transmitting emergency-information-notification system information at a current modification period without waiting until a next modification period starts, when generation of the emergency information is detected; and an emergency-information-notification system information transmitter unit configured to transmit emergency-information-notification system information by using the downlink resource specified by the scheduling information.

In the third aspect, the scheduling-information-notification system information transmitter unit can be configured to transmit, as the predetermined trigger, a predetermined indicator included in a paging message, to the mobile stations in an idle state or a communicating state.

In the third aspect, the scheduling-information-notification system information transmitter unit can be configured to transmit, as the predetermined trigger, a predetermined indicator via a physical downlink control channel including a paging identifier, to the mobile stations in an idle state or a communicating state.

In the third aspect, the scheduling-information-notification system information transmitter unit is configured to transmit, as the predetermined trigger, a predetermined indicator via a physical downlink control channel including a predetermined identifier.

BRIEF DESCRIPTION OF THE DRAWINGS

FIG. 1 is an overall configurational view of a mobile communication system according to a first embodiment of the present invention.

FIG. 2 is a functional block diagram of a radio base station according to the first embodiment of the present invention.

BEST MODE FOR CARRYING OUT THE INVENTION

Configuration of Mobile Communication System according to First Embodiment of Present Invention With reference to FIGS. 1 to 8, the configuration of a mobile communication system according to a first embodiment of the present invention will be described.

As shown in FIG. 1, in the mobile communication system according to this embodiment, a radio base station eNB is configured to transmit multiple kinds of system information MIB (Master Information Block) and SIB1 to SIB9 repeatedly within a modification period MP, to multiple UEs via a broadcast channel BCCH.

As shown in FIG. 2, the radio base station eNB includes an emergency information receiver unit 11 and an emergency information transmitter unit 12.

The emergency information receiver unit 11 is configured to receive emergency information transmitted by an emergency information notification system, in other words, to detect occurrence of emergency information.

The emergency information transmitter unit 12 is configured to transmit the emergency information to the multiple mobile stations UE via the broadcast channel BCCH.

Specifically, the emergency information transmitter unit 12 is configured to notify the multiple mobile stations UE of a predetermined trigger, and to start transmitting scheduling-information-notification system information (MIB/SIB1) to the multiple mobile stations UE at the current modification period MP(n) without waiting until the next modification period MP(n+1) starts, when the emergency information receiver unit 11 receives emergency information, in other words, when the emergency information receiver unit detects occurrence of emergency information. The scheduling-information-notification system information is used for notification of scheduling information which specifies a downlink resource for transmitting emergency-information-notification system information (e.g., SIB9).

The emergency information transmitter unit 12 is also configured to transmit the emergency-information-notification system information (e.g., SIB9) by using the downlink resource specified by the scheduling information.

Figure 3:
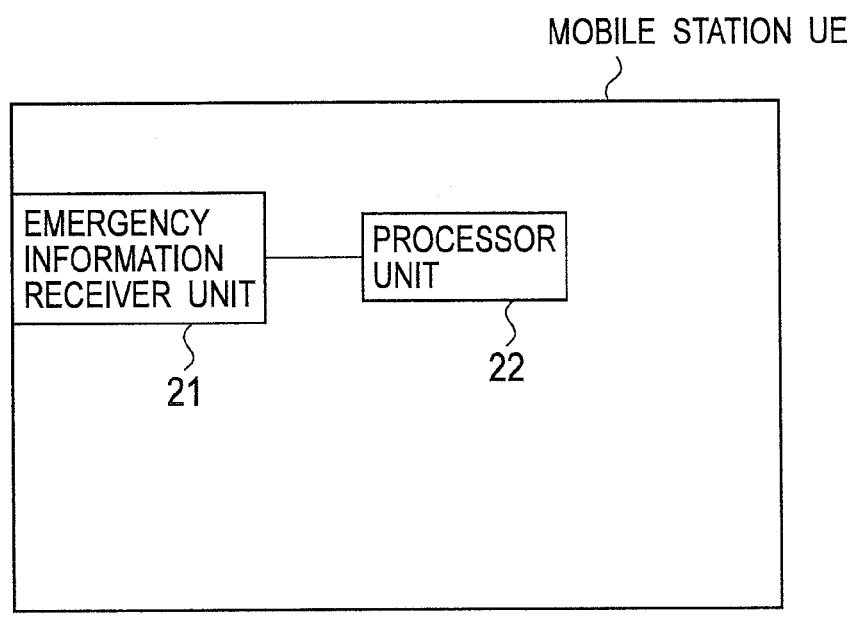
FIG. 3 is a functional block diagram of a mobile station according to the first embodiment of the present invention.

As shown in FIG. 3, each of the mobile stations UE includes an emergency information receiver unit 21 and a processor unit 22.

The emergency information receiver unit 21 is configured to receive emergency information transmitted by the radio base station eNB via the broadcast channel BCCH.

Figure 4:
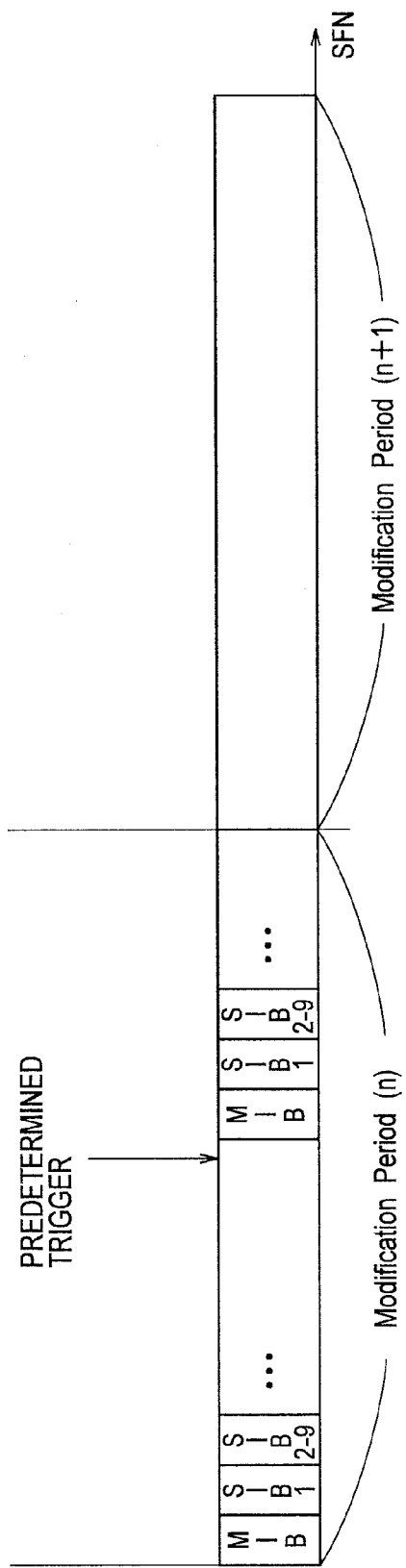
FIG. 4 is a diagram for explaining information transmitted on a BCCH by the radio base station according to the first embodiment of the present invention.

Specifically, as shown in FIG. 4, the emergency information receiver unit 21 is configured to start receiving the scheduling-information-notification system information (MIB/SIB1) at the current modification period MP(n) without waiting until the next modification period MP (n+1) starts, when detecting the predetermined trigger.

The emergency information receiver unit 21 is also configured to receive the emergency-information-notification system information (e.g., SIB9) on the basis of the scheduling information notified by the received scheduling-information-notification system information (MIB/SIB1).

It should be noted in this case that the emergency information receiver unit 21 may be configured not to receive scheduling information (SIB2 to SIB8) except the emergency-information-notification system information (e.g., SIB9).

Here, the emergency information receiver unit 21 may be configured to start receiving the scheduling-information-notification system information (MIB/SIB1) at the current modification period MP(n) without waiting until the next modification period MP (n+1) starts, when the mobile station UE is in an idle state or a communicating state, and when the emergency information receiver unit 21 detects a predetermined indicator (ETWS/PWS indicator) included in a paging message as the predetermined trigger.

Figure 5:
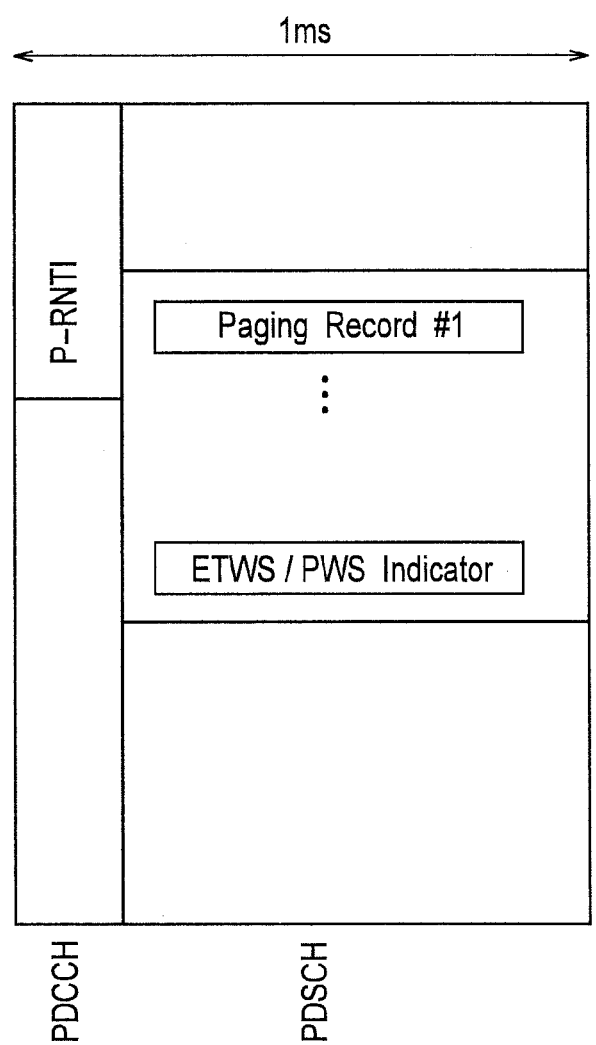
FIG. 5 is a diagram showing an example of an "ETWS/PWS indicator" transmitted by the radio base station according to the first embodiment of the present invention.

As shown in FIG. 5, the paging message is transmitted via a PDSCH (Physical Downlink Shared Channel) corresponding to a P-RNTI via a PDCCH (Physical Downlink Control Channel).

For example, the predetermined indicator (ETWS/PWS indicator) is a 1-bit indicator used for notification of the presence or absence of emergency information, or is primary notification (which is short information to be notified of first as to the emergency information and is used to ring mobile stations or the like).

In other words, the emergency information transmitter unit 12 of the radio base station eNB may be configured to transmit, as the predetermined trigger, the predetermined indicator (ETWS/PWS indicator) in a paging message, to the mobile stations UE in an idle state or a radio-link established state (RRC_connected state).

Figure 6:
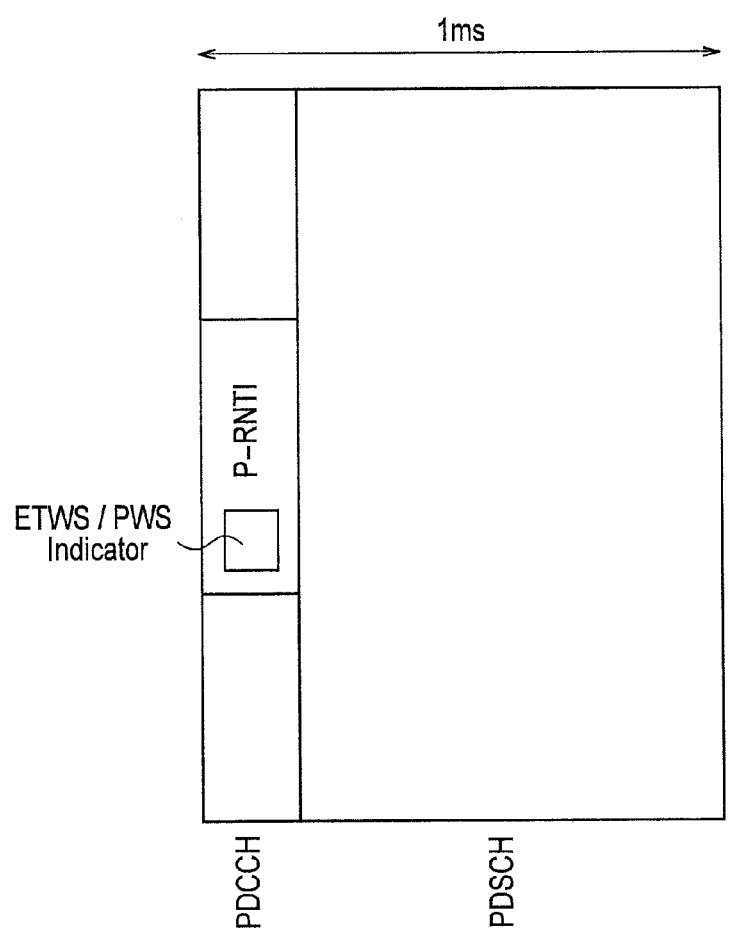
FIG. 6 is a diagram showing an example of the "ETWS/PWS indicator" transmitted by the radio base station according to the first embodiment of the present invention.

In addition, the emergency information receiver unit 21 may also be configured to start receiving the scheduling-information-notification system information (MIB/SIB1) at the current modification period MP(n) without waiting until the next modification period MP (n+1) starts, when the mobile station UE is in an idle state or a communicating state, and when the emergency information receiver unit 21 detects a predetermined indicator (ETWS/PWS indicator) as the predetermined trigger via a PDCCH (Physical Downlink Control Channel) including a P-RNTI (Paging-RNTI) as shown in FIG. 6.

For example, the predetermined indicator (ETWS/PWS indicator) is a 1-bit indicator used for notification of the presence or absence of emergency information, or is primary notification (which is short information to be notified of first as to the emergency information and is used to ring mobile stations).

In other words, the emergency information transmitter unit 12 of the radio base station eNB may be configured to transmit, as the predetermined trigger, the predetermined indicator (ETWS/PWS indicator) via the PDCCH (Physical Downlink Control Channel) including the P-RNTI (Paging-RNTI), to mobile stations UE in an idle state or a radio-link established state (RRC_connected state).

Figure 7:
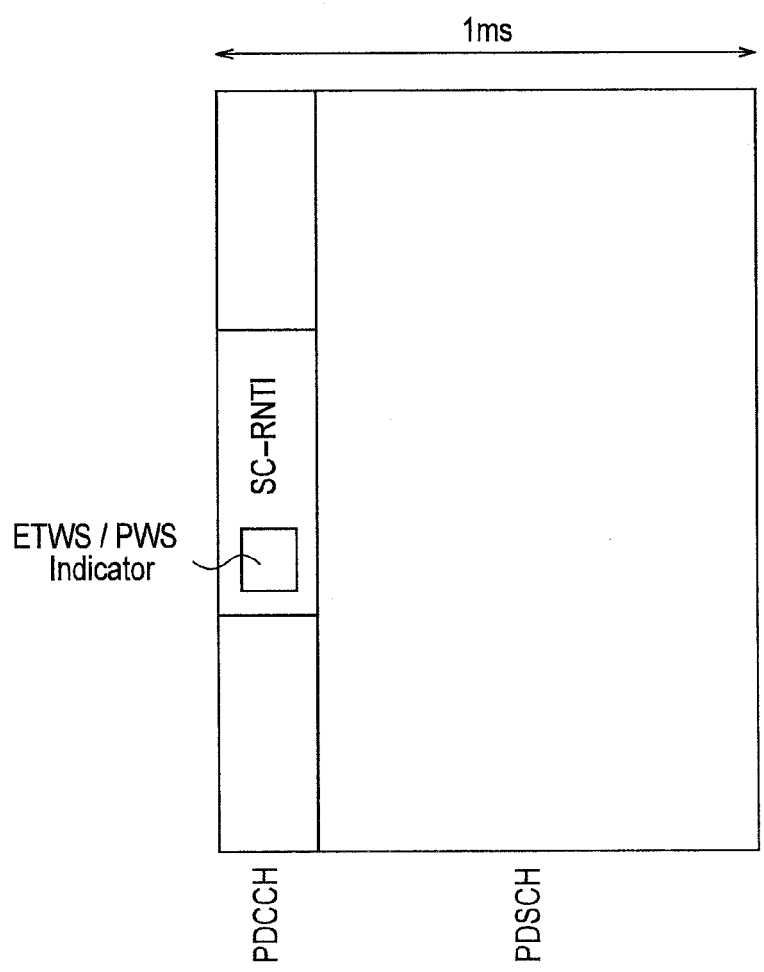
FIG. 7 is a diagram showing an example of a PDCCH including the "ETWS/PWS indicator" transmitted by the radio base station according to the first embodiment of the present invention.

Additionally, the emergency information receiver unit 21 may also be configured to start receiving the scheduling-information-notification system information (MIB/SIB1) at the current modification period MP (n) without waiting until the next modification period MP (n+1) starts, when the mobile station UE is in a radio-link established state (RRC_connected state) or an idle state, and when the emergency information receiver unit 21 detects a predetermined indicator (ETWS/PWS indicator) as the predetermined trigger via a PDCCH (Physical Downlink Control Channel) including an SC-RNTI (System Change-RNTI, i.e., predetermined identifier) as shown in FIG. 7.

For example, the predetermined indicator (ETWS/PWS indicator) is a 1-bit indicator used for notification of the presence or absence of emergency information, or is primary notification (which is short information to be notified of first as to the emergency information and is used to ring mobile stations or the like).

In other words, the emergency information transmitter unit 12 of the radio base station eNB may be configured to transmit, as the predetermined trigger, the predetermined indicator (ETWS/PWS indicator) via the PDCCH (Physical Downlink Control Channel) including the SC-RNTI (System Change-RNTI, i.e., predetermined identifier), to mobile stations UE in an idle state or a radio-link established state (RRC_connected state).

Figure 8:
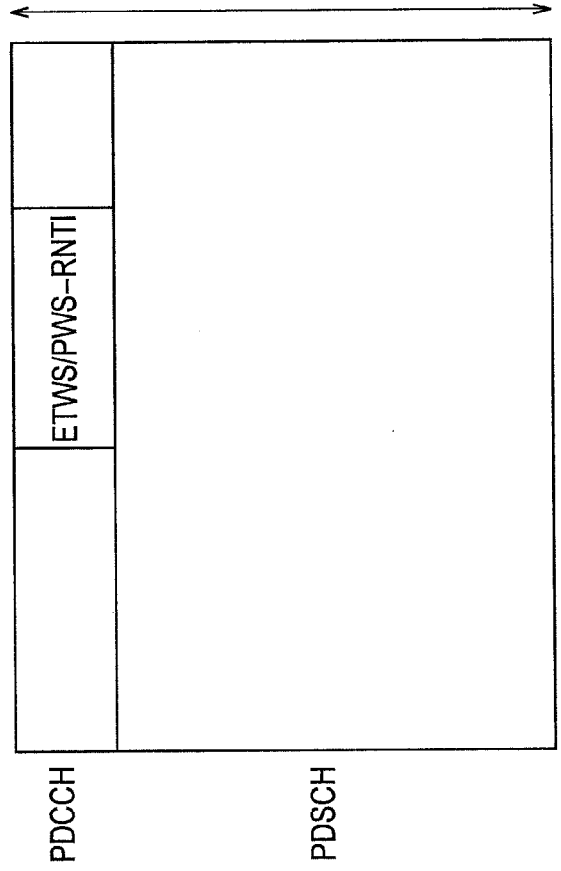
FIG. 8 is a diagram showing an example of a PDCCH including an "ETWS/PWS-RNTI" transmitted by the radio base station according to the first embodiment of the present invention.

In addition, the emergency information receiver unit 21 may also be configured to start receiving the scheduling-information-notification system information (MIB/SIB1) at the current modification period MP(n) without waiting until the next modification period MP (n+1) starts, when detecting a PDCCH (Physical Downlink Control Channel) including an ETWS/PWS-RNTI (predetermined identifier) as the predetermined trigger as shown in FIG. 8.

In other words, the emergency information transmitter unit 12 of the radio base station eNB may be configured to transmit, as the predetermined trigger, predetermined information via the PDCCH (Physical Downlink Control Channel) including the ETWS/PWS-RNTI (predetermined identifier).

The processor unit 22 is configured to perform processing corresponding to the emergency information notified by the received emergency-information-notification system information (e.g., SIB9).

For example, as the processing corresponding to the emergency information, the processor unit 22 may output an alarm corresponding to the emergency information, or show textual information or image information corresponding to the emergency information, on a display.

Operation of Mobile Communication System according to First Embodiment of Present Invention With reference to FIG. 9, operation of the mobile station according the first embodiment of the present invention will be described.

Figure 9:
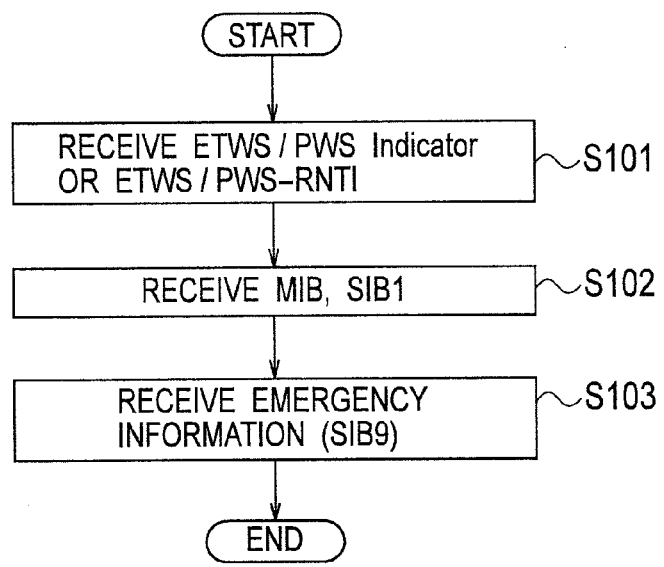
FIG. 9 is a flowchart showing operation of the mobile station according to the first embodiment of the present invention.

As shown in FIG. 9, in Step S101, the mobile station UE detects a PDCCH including an ETWS/PWS-RNTI, or an ETWS/PWS indicator.

In Step S102, the mobile station UE starts receiving the MIB/SIB9 at the current modification period MP(n) without waiting until the next modification period MP(n+1) starts.

In Step S103, the mobile station UE receives the SIB9 on the basis of scheduling information notified by the received MIB/SIB1, and then performs processing (e.g., using an alarm, display, or the like) corresponding to emergency information notified by the SIB9.

Advantageous Effect of Mobile Communication System according to First Embodiment of Present Invention With the mobile communication system according to the first embodiment of the present invention, when detecting a predetermined trigger, a mobile station UE starts receiving the MIB/SIB1 at the current modification period MP(n) without waiting until the next modification period MP(n+1) starts, and then receives the SIB9 for notification of emergency information, on the basis of the MIB/SIB1. Accordingly, multiple mobile stations UE can be notified of generated emergency information as quickly as possible.

Modification

Figure 10:
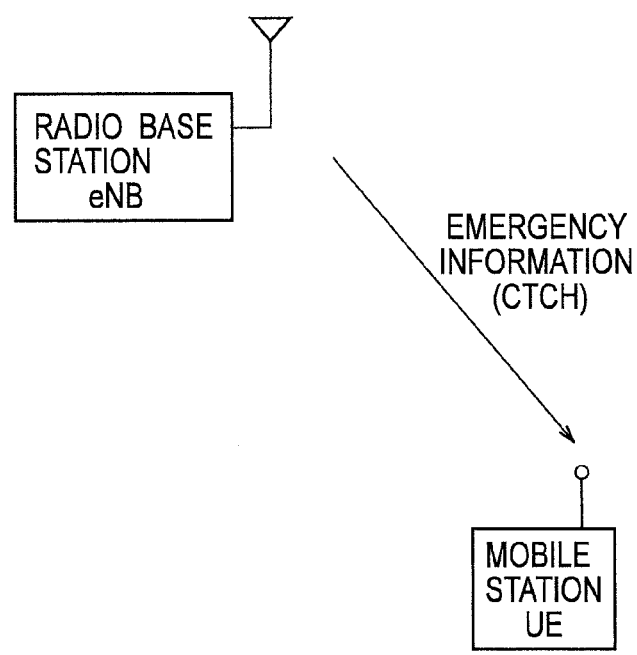
FIG. 10 is an overall configurational view of the mobile communication system according to Modification 1 of the present invention.
Figure 11:
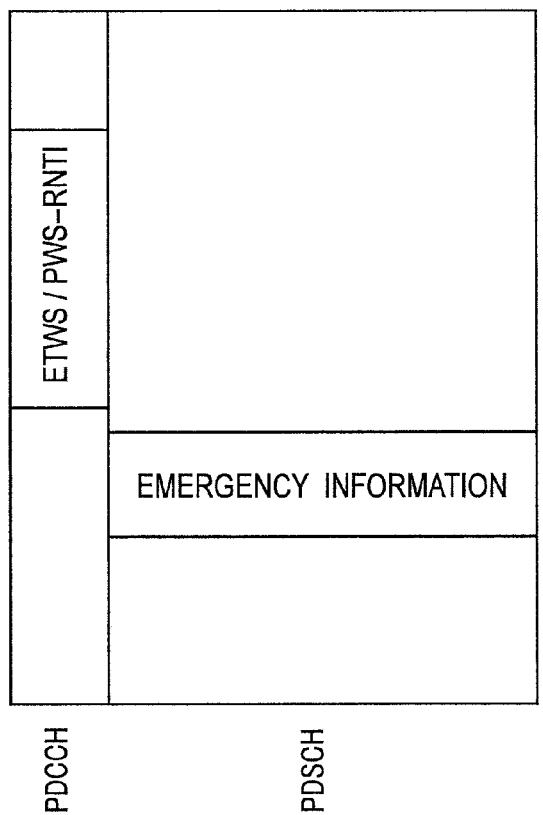
FIG. 11 is a diagram showing an example of a PDCCH including an "ETWS/PWS-RNTI" transmitted by the radio base station according to Modification 1 of the present invention.
Figure 12:
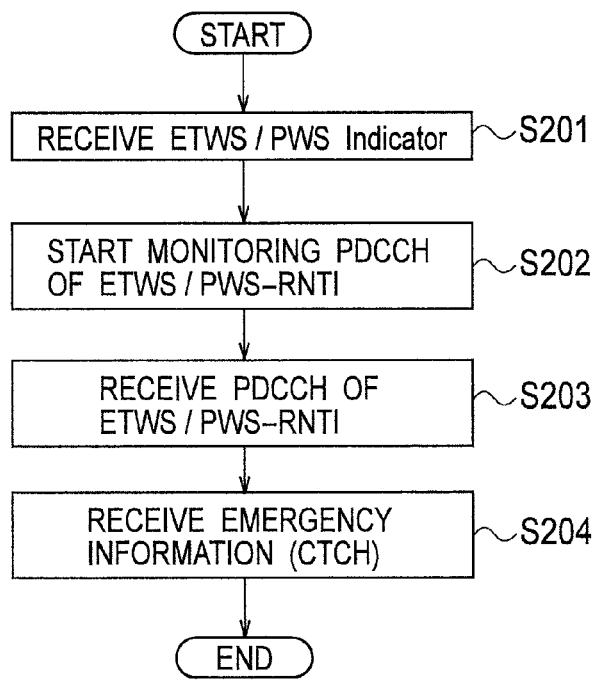
FIG. 12 is a flowchart showing operation of the mobile station according to Modification 1 of the present invention.

With reference to FIGS. 10 to 12, the mobile communication system according to Modification 1 of the present invention will be described while attention is focused on the difference from the mobile communication system according to the first embodiment described above.

As shown in FIG. 10, in the mobile communication system according to Modification 1, the radio base station eNB is configured to transmit emergency information to multiple mobile stations UE via a common traffic channel CTCH.

The emergency information transmitter unit 12 of the radio base station eNB according to Modification 1 is configured to transmit emergency information to the multiple mobile stations UE via the common traffic channel CTCH.

Specifically, the emergency information transmitter unit 12 is configured to notify the multiple mobile stations UE of a predetermined indicator (ETWS/PWS indicator), and to transmit the emergency information to the multiple mobile stations UE via a downlink resource (the CTCH on a PDSCH (Physical Downlink Shared Channel)) specified by a physical downlink control channel (PDCCH) including a predetermined identifier (ETWS/PWS-RNTI), when the emergency information receiver unit 11 receives emergency information, in other words, when the emergency information receiver unit 11 detects occurrence of emergency information.

In addition, the emergency information receiver unit 21 of the mobile station UE according to Modification 1 is configured to receive the emergency information transmitted by the radio base station eNB via the common traffic channel CTCH.

Specifically, the emergency information receiver unit 21 is configured to start monitoring the physical downlink control channel (PDCCH) including the predetermined indicator (ETWS/PWS-RNTI), when detecting the predetermined indicator (ETWS/PWS indicator) The emergency information receiver unit 21 is configured to receive the emergency information via the downlink resource (the CTCH on the PDSCH) specified by the physical downlink control channel (PDCCH), when detecting the physical downlink control channel (PDCCH).

Here, the emergency information receiver unit 21 may be configured to start monitoring the physical downlink control channel (PDCCH) including the predetermined identifier (ETWS/PWS-RNTI), when the mobile station UE is in an idle state or a radio-link established state (RRC_connected state, i.e., communicating state), and when the emergency information receiver unit 21 detects the predetermined indicator (ETWS/PWS indicator) in a paging message.

Specifically, the emergency information receiver unit 21 may be configured to start monitoring the physical downlink control channel (PDCCH) including the predetermined identifier (ETWS/PWS-RNTI), when the mobile station UE is in an idle state or a radio-link established state (RRC_connected state, i.e., communicating state), and when the emergency information receiver unit 21 receives the predetermined indicator (ETWS/PWS indicator) via a physical downlink control channel including a paging identifier, that is, when the emergency information receiver unit 21 detects the predetermined indicator.

As shown in FIG. 6, the emergency information receiver unit 21 may be configured to start monitoring the physical downlink control channel (PDCCH) including the predetermined identifier (ETWS/PWS-RNTI), when receiving the predetermined indicator (ETWS/PWS indicator) via a PDCCH (predetermined Physical Downlink Control Channel) including a P-RNTI (Paging-RNTI), in other words, when detecting the predetermined indicator.

In addition, the emergency information receiver unit 21 may be configured to start monitoring the physical downlink control channel (PDCCH) including the predetermined identifier (ETWS/PWS-RNTI), when the mobile station UE is in a radio-link established state (RRC_connected state) or an idle state, and when the emergency information receiver unit 21 detects the predetermined indicator (ETWS/PWS indicator) via a PDCCH (predetermined Physical Downlink Control Channel) including an SC-RNTI (System Change-RNTI, i.e., predetermined identifier) as shown in FIG. 7.

As shown in FIG. 11, the emergency information is transmitted via the downlink resource (the CTCH on the PDSCH) specified by the physical downlink control channel (PDCCH) including the predetermined identifier (ETWS/PWS-RNTI).

With reference to FIG. 12, operation of the mobile station UE according to Modification 1 will be described.

As shown in FIG. 12, in Step S201, the mobile station UE detects an ETWS/PWS indicator.

In Step S202, the mobile station UE starts monitoring a physical downlink control channel (PDCCH) including an ETWS/PWS-RNTI.

In Step S203, the mobile station UE detects the physical downlink control channel (PDCCH) including the ETWS/PWS-RNTI.

In Step S204, the mobile station UE receives emergency information via a downlink resource (a CTCH on a PDSCH) specified by the physical downlink control channel (PDCCH), and then performs processing (e.g., using an alarm, display, or the like) corresponding to the emergency information.

In the mobile communication system according to Modification 1, the mobile station UE is configured to start monitoring a physical downlink control channel (PDCCH) including an ETWS/PWS-RNTI, when detecting a predetermined indicator (ETWS/PWS indicator). When detecting the physical downlink control channel (PDCCH) including the ETWS/PWS-RNTI, then the mobile station UE is configured to receive emergency information via a downlink resource specified by the physical downlink control channel (PDCCH). Accordingly, multiple mobile stations UE can be notified of generated emergency information as quickly as possible.

Note that the features of Modification 1 described above can be expressed as follows.

The first aspect of Modification 1 is summarized as an emergency-information notification method in which a radio base station eNB notify multiple mobile stations UE of emergency information, the method including the steps of: (A) starting, at the mobile stations UE, monitoring a physical downlink control channel including a predetermined identifier, when a predetermined indicator is detected; (B) receiving, at the mobile stations UE, the emergency information via a downlink resource specified by the physical downlink control channel, when the mobile stations UE detect the physical downlink control channel; and (C) performing, at the mobile stations UE, processing corresponding to the received emergency information.

The second aspect of Modification 1 is summarized as a mobile station UE configured to receive emergency information transmitted by a radio base station eNB, the mobile station UE including: an emergency-information receiver unit configured to start monitoring a physical downlink control channel including a predetermined identifier when detecting a predetermined indicator, and to receive the emergency information via a downlink resource specified by the physical downlink control channel when detecting the physical downlink control channel; and a processor unit configured to perform processing corresponding to the received emergency information.

In the second aspect of Modification 1, the emergency information receiver unit may be configured to start monitoring the physical downlink control channel, when the mobile station UE is in an idle state or a communicating state, and when the emergency information receiver unit detects the predetermined indicator in a paging message.

In the second aspect of Modification 1, the emergency information receiver unit may be configured to start monitoring the physical downlink control channel, when the mobile station UE is in an idle state or a communicating state, and when the emergency information receiver unit receives the predetermined indicator via a physical downlink control channel including a paging identifier.

In the second aspect of Modification 1, the emergency information receiver unit may be configured to start monitoring the physical downlink control channel, when receiving the predetermined indicator via a predetermined physical downlink control channel.

The third aspect of Modification 1 is summarized as a radio base station eNB configured to transmit emergency information to multiple mobile stations UE, the radio base station eNB including: an emergency information transmitter unit configured to notify the multiple mobile stations UE of a predetermined indicator, and to transmit the emergency information to the multiple mobile stations UE via a downlink resource specified by a physical downlink control channel including a predetermined identifier, when detecting occuirrence of the emergency information.

In the third aspect of Modification 1, the emergency information transmitter unit may be configured to transmit the predetermined indicator included in a paging message, to the mobile stations UE in an idle state or communicating state.

In the third aspect of Modification 1, the emergency information transmitter unit may be configured to transmit the predetermined indicator via a physical downlink control channel including a paging identifier, to the mobile stations UE in an idle state or communicating state.

In the third aspect of Modification 1, the emergency information transmitter unit may be configured to transmit the predetermined indicator via a predetermined physical downlink control channel.

Note that operation of the above described mobile station UE and of the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As has been described above, with the present invention, it is possible to provide an emergency-information receiving method, a mobile station, and a radio base station which allow a plurality of the mobile stations to receive emergency information as quickly as possible upon detection of occurence of the emergency information.

The invention claimed is:

1. An emergency-information receiving method in which a plurality of mobile stations receives emergency information in a mobile communication system in which a radio base station is configured to transmit a plurality of types of system information repeatedly within a modification period to the mobile stations via a broadcast channel, and to notify the mobile stations of a predetermined trigger via the broadcast channel regardless of the modification period, the method comprising the steps of:

(A) starting, at the mobile stations, receiving scheduling-information-notification system information at a current modification period without waiting until a next modification period starts, when detecting the predetermined trigger; and (B) receiving, at the mobile stations, emergency-information-notification system information on the basis of scheduling information notified by the received scheduling-information-notification system information, wherein, when an emergency-information-notification system information receiver unit of the mobile station detects a predetermined indicator included in a paging message, as the predetermined trigger, the mobile station starts receiving the scheduling-information-notification system information at the current modification period.

2. The emergency-information receiving method according to claim 1, further comprising a step of:

(C) performing, at the mobile stations, processing corresponding to the emergency information notified by the received emergency-information-notification system information.

3. A mobile station configured to receive emergency information in a mobile communication system in which a radio base station is configured to transmit a plurality of types of system information repeatedly within a modification period to a plurality of mobile stations via a broadcast channel, and to notify the mobile stations of a predetermined trigger via the broadcast channel regardless of the modification period, the mobile station comprising:

a scheduling-information-notification system information receiver unit configured to start receiving scheduling-information-notification system information at a current modification period without waiting until a next modification period starts, when detecting the predetermined trigger; and an emergency-information-notification system information receiver unit configured to receive emergency-information-notification system information on the basis of scheduling information notified by the received scheduling-information-notification system information, wherein, when the emergency-information-notification system information receiver unit detects a predetermined indicator included in a paging message, as the predetermined trigger, the mobile station starts receiving the scheduling-information-notification system information at the current modification period.

4. The mobile station according to claim 3, further comprising:

a processor unit configured to perform processing corresponding to the emergency information notified by the received emergency-information-notification system information.

5. The mobile station according to claim 3, wherein
the emergency-information-notification system information receiver unit is configured to receive no system information except the emergency-information-notification system information.

6. The mobile station according to claim 3, wherein
the scheduling-information-notification system information receiver unit is configured to start receiving the scheduling-information-notification system information at the current modification period without waiting until the next modification period starts, when the mobile station is in an idle state or a communicating state, and when the scheduling-information-notification system information receiver unit detects a predetermined indicator included in a paging message as the predetermined trigger.

7. The mobile station according to claim 3, wherein
the scheduling-information-notification system information receiver unit is configured to start receiving the scheduling-information-notification system information at the current modification period without waiting until the next modification period starts, when the mobile station is in an idle state or a communicating state, and when the scheduling-information-notification system information receiver unit receives a predetermined indicator as the predetermined trigger via a physical downlink control channel including a paging identifier.

8. The mobile station according to claim 3, wherein
the scheduling-information-notification system information receiver is configured to start receiving the scheduling-information-notification system information at the current modification period without waiting until the next modification period starts, when receiving a predetermined indicator as the predetermined trigger via a physical downlink control channel.

9. A radio base station configured to transmit emergency information in a mobile communication system in which the radio base station is configured to transmit a plurality of types of system information repeatedly within a modification period to a plurality of mobile stations via a broadcast channel, and to notify the mobile stations of a predetermined trigger via the broadcast channel regardless of the modification period, the radio base station comprising:
   a scheduling-information-notification system information transmitter unit configured to notify, to the plurality of mobile stations, a predetermined trigger, and to start transmitting, to the plurality of mobile stations, scheduling-information-notification system information for notifying scheduling information which specifies a downlink resource for transmitting emergency-information-notification system information at a current modification period without waiting until a next modification period starts, when generation of the emergency information is detected; and
   an emergency-information-notification system information transmitter unit configured to transmit emergency-information-notification system information by using the downlink resource specified by the scheduling information,
   wherein, when an emergency-information-notification system information receiver unit of the mobile station detects a predetermined indicator included in a paging message, as the predetermined trigger, the mobile station starts receiving the scheduling-information-notification system information at the current modification period.

10. The radio base station according to claim 9, wherein
the scheduling-information-notification system information transmitter unit is configured to start transmitting, as the predetermined trigger, a predetermined indicator included in a paging message, to the mobile stations in an idle state or a communicating state.

11. The radio base station according to claim 9, wherein
the scheduling-information-notification system information transmitter unit is configured to transmit, as the predetermined trigger, a predetermined indicator via a physical downlink control channel including a paging identifier, to the mobile stations in an idle state or a communicating state.

12. The radio base station according to claim 9, wherein
the scheduling-information-notification system information transmitter unit is configured to transmit, as the predetermined trigger, a predetermined indicator via a physical downlink control channel including a predetermined identifier.

* * * * *